US012242001B2

(12) United States Patent
McCord

(10) Patent No.: US 12,242,001 B2
(45) Date of Patent: Mar. 4, 2025

(54) SCANNING LIDAR WITH FLOOD ILLUMINATION FOR NEAR-FIELD DETECTION

(71) Applicant: Cepton Technologies, Inc., San Jose, CA (US)

(72) Inventor: Mark Armstrong McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 948 days.

(21) Appl. No.: 17/205,792

(22) Filed: Mar. 18, 2021

(65) Prior Publication Data

US 2021/0302543 A1 Sep. 30, 2021

Related U.S. Application Data

(60) Provisional application No. 62/994,105, filed on Mar. 24, 2020.

(51) Int. Cl.
| | |
|---|---|
| *G01S 7/00* | (2006.01) |
| *G01S 7/481* | (2006.01) |
| *G01S 7/483* | (2006.01) |
| *G01S 17/10* | (2020.01) |
| *G01S 17/93* | (2020.01) |

(52) U.S. Cl.
CPC .......... *G01S 7/4817* (2013.01); *G01S 7/4813* (2013.01); *G01S 7/483* (2013.01); *G01S 17/10* (2013.01); *G01S 17/93* (2013.01)

(58) Field of Classification Search
USPC ....................................................... 356/5.01
See application file for complete search history.

(56) References Cited

U.S. PATENT DOCUMENTS

| | | | | |
|---|---|---|---|---|
| 9,128,190 | B1 * | 9/2015 | Ulrich | ..................... G02B 26/08 |
| 9,864,063 | B2 * | 1/2018 | Gruver | ..................... G01S 17/10 |
| 10,209,359 | B2 * | 2/2019 | Russell | ..................... G01S 17/26 |
| 10,845,466 | B2 * | 11/2020 | Pei | ......................... G01S 7/4817 |

(Continued)

OTHER PUBLICATIONS

International Search Report/Written Opinion of the International Searching Authority dated Jun. 8, 2021 in related International Application No. PCT/US2021/023241, filed Mar. 19, 2021 (twelve pages).

(Continued)

*Primary Examiner* — James R Hulka
(74) *Attorney, Agent, or Firm* — Kilpatrick Townsend & Stockton LLP

(57) ABSTRACT

A LiDAR sensor includes a first lens, a first laser source configured to emit a plurality of first light pulses to be collimated by the first lens, a flood illumination source configured to emit a plurality of second light pulses as diverging light rays, a second lens configured to receive and focus (i) a portion of any one of the plurality of first light pulses and (ii) a portion of any one of the plurality of second light pulses that are reflected off of the one or more objects, a detector configured to detect (i) the portion of any one of the plurality of first light pulses and (ii) the portion of any one of the plurality of second light pulses, and a processor configured to construct a three-dimensional image of the one or more objects based on the detected portions of first light pulses and second light pulses.

20 Claims, 8 Drawing Sheets

(56) References Cited

U.S. PATENT DOCUMENTS

| | | | |
|---|---|---|---|
| 10,921,431 B2* | 2/2021 | Pei | G01S 17/42 |
| 11,125,860 B2* | 9/2021 | Galera | G01S 7/4802 |
| 2009/0147239 A1* | 6/2009 | Zhu | G01S 7/4817 |
| | | | 356/5.01 |
| 2015/0131080 A1* | 5/2015 | Retterath | G01S 17/10 |
| | | | 356/5.01 |
| 2015/0293228 A1* | 10/2015 | Retterath | G01S 17/931 |
| | | | 356/5.01 |
| 2015/0378012 A1* | 12/2015 | Sayyah | H01S 5/021 |
| | | | 438/25 |
| 2017/0155225 A1* | 6/2017 | Villeneuve | H01S 3/06754 |
| 2017/0219713 A1 | 8/2017 | Gruver et al. | |
| 2018/0180722 A1 | 6/2018 | Pei et al. | |
| 2018/0284278 A1 | 10/2018 | Russell et al. | |
| 2019/0101623 A1 | 4/2019 | Galera et al. | |
| 2019/0120940 A1 | 4/2019 | Pei et al. | |
| 2019/0212446 A1* | 7/2019 | Jeong | G01S 17/08 |
| 2019/0310351 A1* | 10/2019 | Hughes | G02B 26/101 |
| 2019/0367061 A1* | 12/2019 | Mesher | G01S 19/45 |
| 2020/0073401 A1* | 3/2020 | Szatmary | G05D 1/0257 |
| 2020/0158825 A1* | 5/2020 | Meissner | G01S 17/931 |
| 2020/0160709 A1* | 5/2020 | Ramot | G06Q 10/047 |

OTHER PUBLICATIONS

International Preliminary Report on Patentability dated Oct. 6, 2022 in related International Application No. PCT/US2021/023241 (eleven pages).

* cited by examiner

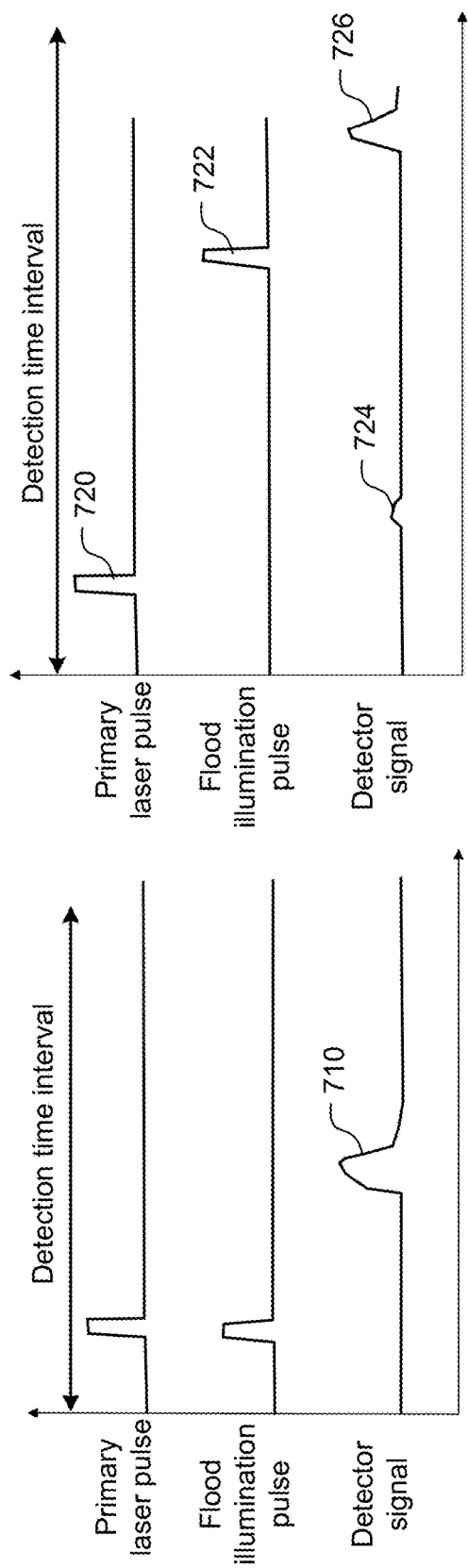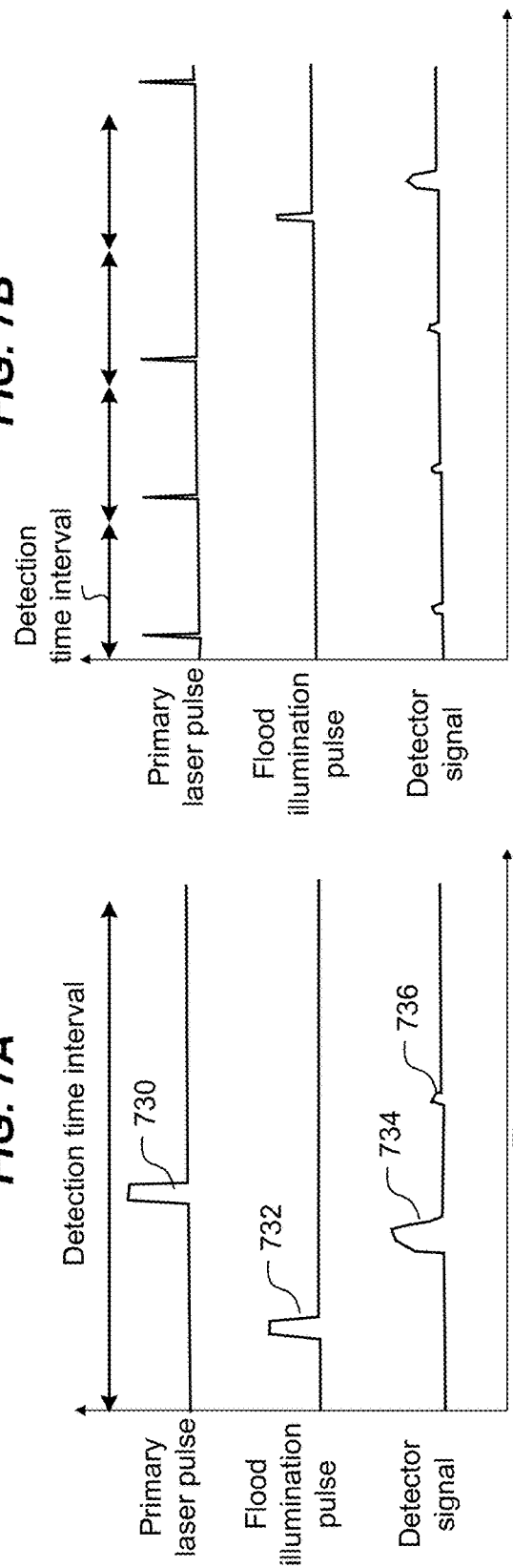

SCANNING LIDAR WITH FLOOD ILLUMINATION FOR NEAR-FIELD DETECTION

CROSS-REFERENCES TO RELATED APPLICATIONS

This application claims the benefit of U.S. Provisional Patent Application No. 62/994,105, filed on Mar. 24, 2020, the content of which is incorporated by reference in its entirety.

BACKGROUND OF THE INVENTION

Three-dimensional sensors can be applied in autonomous vehicles, drones, robotics, security applications, and the like. Scanning LiDAR sensors can achieve high angular resolutions appropriate for such applications at an affordable cost. However, improved scanning LiDAR sensors capable of detecting both near and far objects are needed.

SUMMARY OF THE INVENTION

According to some embodiments, a LiDAR sensor includes a first lens defining a first optical axis, and a first laser source disposed substantially at a focal plane of the first lens and configured to emit a plurality of first light pulses to be collimated by the first lens and directed toward a field of view of the LiDAR sensor. The LiDAR sensor further includes a flood illumination source configured to emit a plurality of second light pulses as diverging light rays directed toward the field of view of the LiDAR sensor, and a second lens defining a second optical axis substantially parallel to the first optical axis, the second lens configured to: receive and focus a portion of any one of the plurality of first light pulses that is reflected off of one or more objects in the field of view onto a focal plane of the second lens; and receive and focus a portion of any one of the plurality of second light pulses that is reflected off of the one or more objects in the field of view onto the focal plane of the second lens. The LiDAR sensor further includes a detector disposed substantially at the focal plane of the second lens, and configured to detect (i) the portion of any one of the plurality of first light pulses that is reflected off of the one or more objects, and (ii) the portion of any one of the plurality of second light pulses that is reflected off of the one or more objects. The LiDAR sensor further includes a processor communicatively coupled to the first laser source, the flood illumination source, and the detector. The processor is configured to construct a three-dimensional image of the one or more objects based on the portion of any one of the plurality of first light pulses and the portion of any one of the plurality of second light pulses detected by the detector.

According to some embodiments, a method of operating a LiDAR sensor includes emitting, using a first laser source, a plurality of first light pulses, and collimating, using a first lens, the plurality of first light pulses so that the plurality of first light pulses are directed toward a field of view of the LiDAR sensor. The first lens defines a first optical axis. The method further includes emitting, using a flood illumination source, a plurality of second light pulses as diverging light rays directed toward the field of view of the LiDAR sensor, and focusing, using a second lens defining a second optical axis substantially parallel to the first optical axis, (i) a portion of any one of the plurality of first light pulses that is reflected off of one or more objects in the field of view, and (ii) a portion of any one of the plurality of second light pulses that is reflected off of the one more objects in the field of view, onto a detection plane. The method further includes detecting, using a detector positioned at the detection plane, (i) the portion of any one of the plurality of first light pulses that is reflected off of the one or more objects, and (ii) the portion of any one of the plurality of second light pulses that is reflected off of the one or more objects. The method further includes constructing a three-dimensional image of the one or more objects based on the portion of any one of the plurality of first light pulses and the portion of any one of the plurality of second light pulses detected by the detector.

BRIEF DESCRIPTION OF THE DRAWINGS

FIGS. 7A-7D show some exemplary timing diagrams for firing a regular laser source and a flood illumination source in a LiDAR sensor according to various embodiments.

DETAILED DESCRIPTION OF THE SPECIFIC EMBODIMENTS

The present invention relates generally to LiDAR systems for three-dimensional imaging. More specifically, the present invention relates to LiDAR systems that are capable of detecting both near and far objects.

Figure 1:
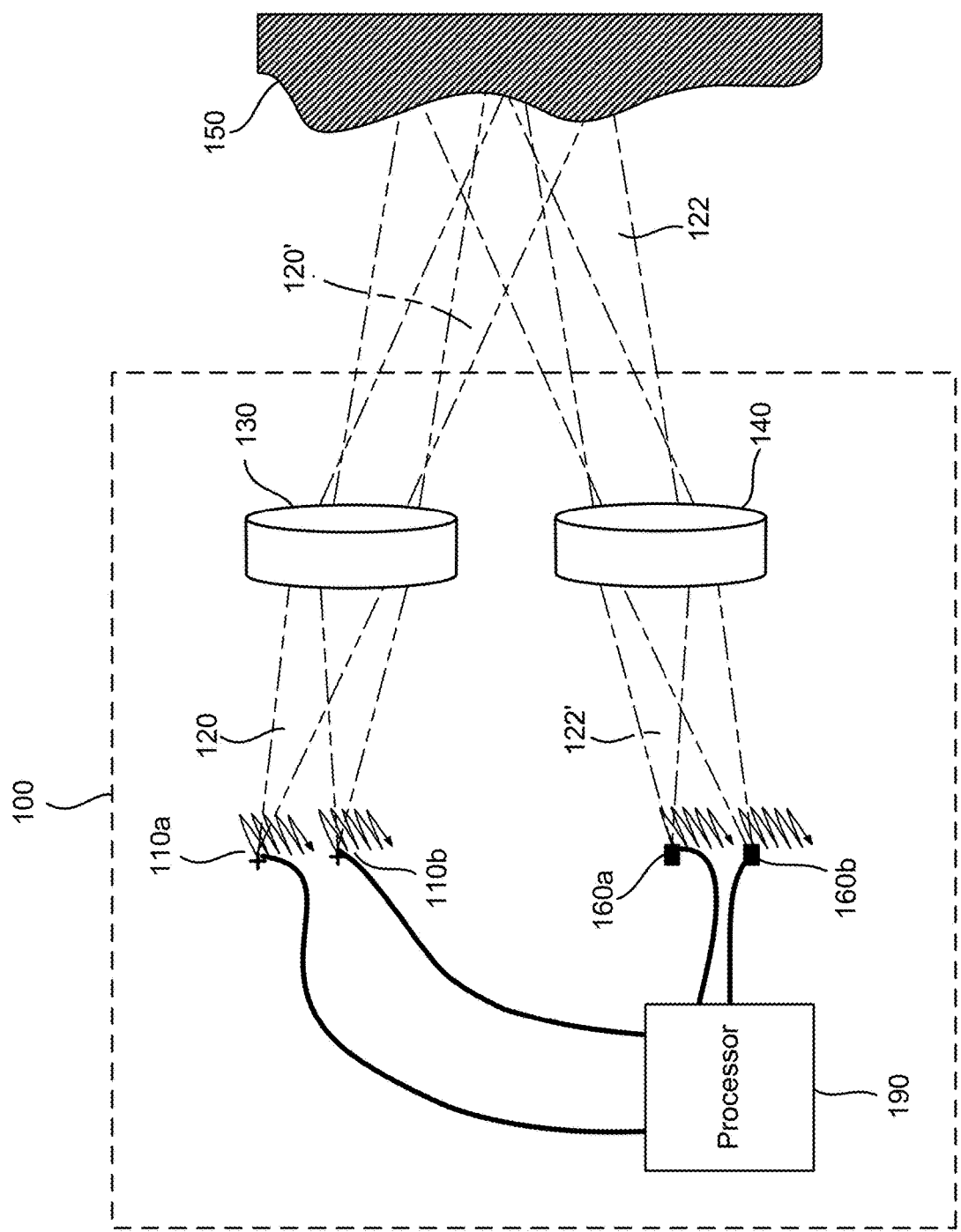
FIG. 1 illustrates schematically an exemplary LiDAR sensor for three-dimensional imaging.

FIG. 1 illustrates schematically an exemplary LiDAR sensor 100 for three-dimensional imaging. The LiDAR sensor 100 includes an emitting lens 130 and a receiving lens 140, both being fixed. The LiDAR sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the LiDAR sensor 100. For a given emission location of the laser source 110a, the collimated laser pulse 120' is directed at a corresponding angle toward the object 150.

A portion 122 of the laser pulse 120 is reflected off of the object 150 toward the receiving lens 140. The receiving lens 140 is configured to focus the portion 122 of the laser pulse 120 reflected off of the object 150 onto a corresponding detection location in the focal plane of the receiving lens 140. The LiDAR sensor 100 further includes a photodetector 160a disposed substantially at the focal plane of the receiving lens 140. The photodetector 160a is configured to receive and detect the portion 122 of the laser pulse 120 reflected off of the object at the corresponding detection location. The corresponding detection location of the photodetector 160*a* is conjugate with the respective emission location of the laser source 110*a*.

The laser pulse 120 may be of a short duration, for example, 10 ns pulse width. The LiDAR sensor 100 further includes a processor 190 coupled to the laser source 110*a* and the photodetector 160*a*. The processor 190 is configured to determine a time of flight (TOF) of the laser pulse 120 from emission to detection. Since the laser pulse 120 travels at the speed of light, a distance between the LiDAR sensor 100 and the object 150 may be determined based on the determined time of flight.

According to some embodiments, the laser source 110*a* may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 110*a* is raster scanned within a certain area in the back focal plane of the emitting lens 130, a corresponding object area on the object 150 is scanned. The photodetector 160*a* is raster scanned to a plurality of corresponding detection locations in the focal plane of the receiving lens 140. The scanning of the photodetector 160*a* is performed synchronously with the scanning of the laser source 110*a*, so that the photodetector 160*a* and the laser source 110*a* are always conjugate with each other at any given time.

By determining the time of flight for each laser pulse emitted at a respective emission location, the distance from the LiDAR sensor 100 to each corresponding point on the surface of the object 150 may be determined. In some embodiments, the processor 190 is coupled with a position encoder that detects the position of the laser source 110*a* at each emission location. Based on the emission location, the angle of the collimated laser pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the LiDAR sensor 100 may be estimated based on the scanning range of the laser source 110*a* and the focal length of the emitting lens 130 as, $$AFOV = 2\tan^{-1}\left(\frac{h}{2f}\right),\tag{1}$$

where h is scan range of the laser source 110*a* along certain direction, and f is the focal length of the emitting lens 130. For a given scan range h, shorter focal lengths would produce wider AFOVs. For a given focal length f, larger scan ranges would produce wider AFOVs. In some embodiments, the LiDAR sensor 100 may include multiple laser sources disposed as an array at the back focal plane of the emitting lens 130, so that a larger total AFOV may be achieved while keeping the scan range of each individual laser source relatively small. Accordingly, the LiDAR sensor 100 may include multiple photodetectors disposed as an array at the focal plane of the receiving lens 140, each photodetector being conjugate with a respective laser source. For example, the LiDAR sensor 100 may include a second laser source 110*b* and a second photodetector 160*b*, as illustrated in FIG. 1. In other embodiments, the LiDAR sensor 100 may include four laser sources and four photodetectors, or eight laser sources and eight photodetectors. In one embodiment, the LiDAR sensor 100 may include 8 laser sources arranged as a 4×2 array and 8 photodetectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emitting lens, the scan range of each laser source, and the number of laser sources.

The laser source 110*a* may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The photodetector 160*a* may comprise a silicon avalanche photodiode, a photomultiplier, a PIN diode, or other semiconductor sensors.

The angular resolution of the LiDAR sensor 100 can be effectively diffraction limited, which may be estimated as, $$\theta = 1.22\lambda/D,\tag{2}$$

where λ is the wavelength of the laser pulse, and D is the diameter of the lens aperture. The angular resolution may also depend on the size of the emission area of the laser source 110*a* and aberrations of the lenses 130 and 140. According to various embodiments, the angular resolution of the LiDAR sensor 100 may range from about 1 mrad to about 20 mrad (about 0.05-1.0 degrees), depending on the type of lenses.

In some cases, it can be difficult for a LiDAR sensor to accurately detect nearby objects (e.g., objects within about 10 m from the LiDAR sensor). For example, because of the proximity between a laser source and a detector, firing a laser source can generate a large electromagnetic pulse that can "blind" the detector for several nanoseconds to several tens of nanoseconds after the firing. Thus, objects that are close enough to the LiDAR sensor to return a signal within this time window may not be detected. As an example, an object that is 1.5 m from the LiDAR sensor, a return laser pulse from the object can arrive at the detector in about 10 nanoseconds after the laser firing. If that falls within the "blind time window" of the detector, the return laser pulse may not be detected by the detector. In addition, return laser pulses from nearby objects can have excessive laser powers that can possibly overload and saturate the detector. Thus, a return pulse from a nearby object can result in inaccurate determination of the distance and the reflectance of the object.

Figure 2:
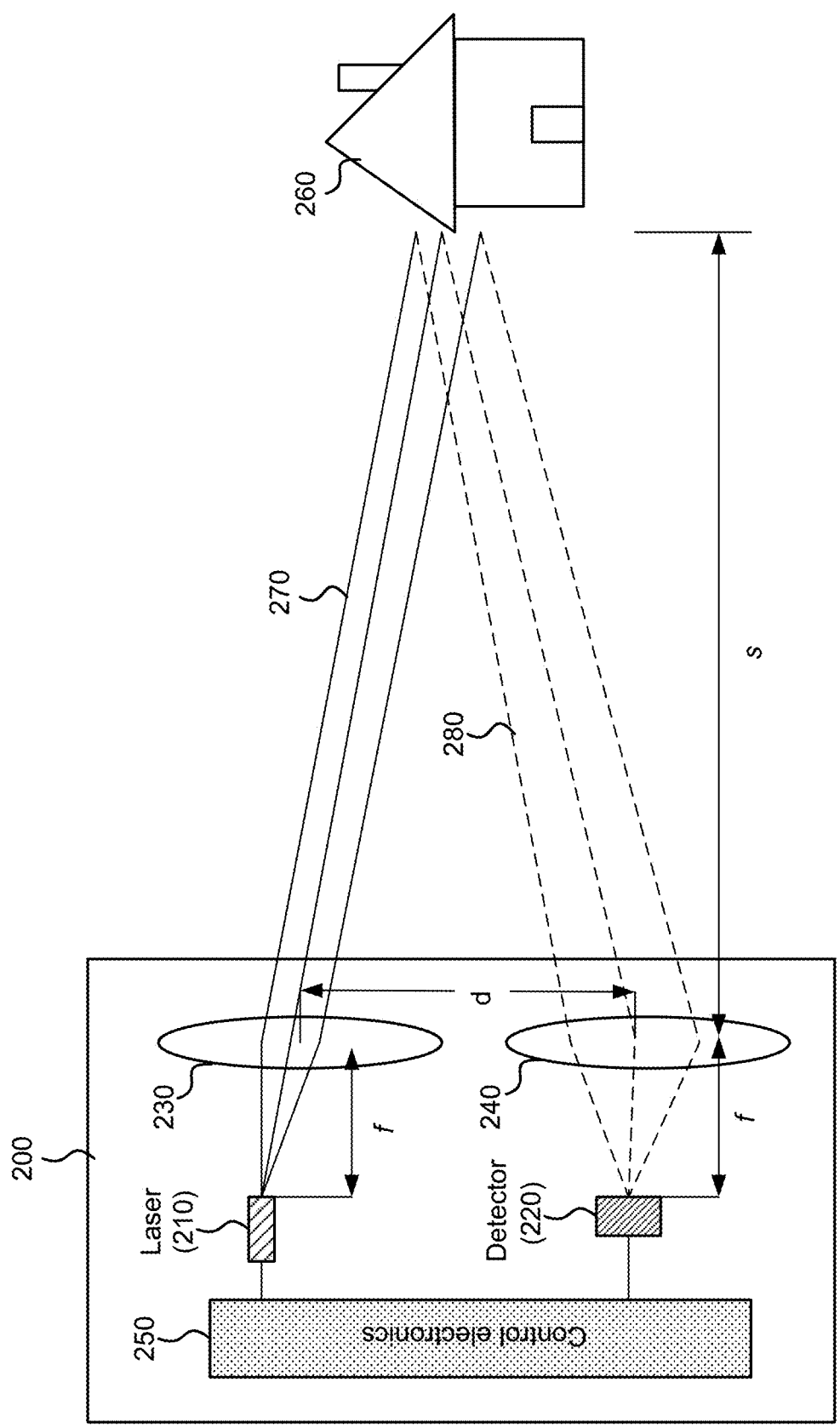
FIG. 2 illustrates the operation of an exemplary LiDAR sensor.

Another factor that can cause a LiDAR system to be unable to detect nearby objects is parallax. Some LiDAR sensors include two lenses—one as an emission lens to collimate the outgoing laser pulses, and the other one as a receiving lens to focus the return laser pulses onto the detector. FIG. 2 illustrates the operation of an exemplary LiDAR sensor 200. The LiDAR sensor 200 can include a laser source 210 and a detector 220, which can be communicatively coupled to control electronics 250. (The LiDAR sensor 200 can include additional laser sources and additional detectors. Only one laser source 210 and one detector 220 are illustrated in FIG. 2 for simplicity.) The control electronics 250 can include a computer processor for processing the detected signals and constructing three-dimensional images (e.g., a point cloud).

The LiDAR sensor 200 can also include an emission lens 230 and a receiving lens 240. The optical axis of the emission lens 230 and the optical axis of the receiving lens 240 can be substantially parallel to each other. The laser source 210 can be positioned substantially at the focal plane of the emission lens 230. The detector 220 can be positioned substantially at the focal plane of the receiving lens 240. Thus, light rays 270 of a laser pulse emitted by the laser source 210 can be collimated by the emission lens 230. The collimated light rays 270 can be incident on an object 260 (e.g., a house) and be reflected. The return light rays 280 can be focused by the receiving lens 240 onto the detector 220.

Because the emission lens 230 and the receiving lens 240 are separated from each other by a finite distance in the lateral direction perpendicular to the optical axis of the LiDAR sensor 200, there can be some parallax error for the return light rays 280. Assume that the separation distance between the emission lens 230 and the receiving lens 240 is d, the focal lengths of the emission lens 230 and the receiving lens 240 are both f and the distance of the object 260 from the LiDAR sensor 200 is s. The parallax error can be approximately expressed as (f×d)/s. For far away objects (e.g., s>>d), the parallax error can be negligible. If the parallax error is smaller than the size of the detector 220 (e.g., 0.5 mm diameter), the return light rays 280 will still be detected by the detector 220.

Figure 3:
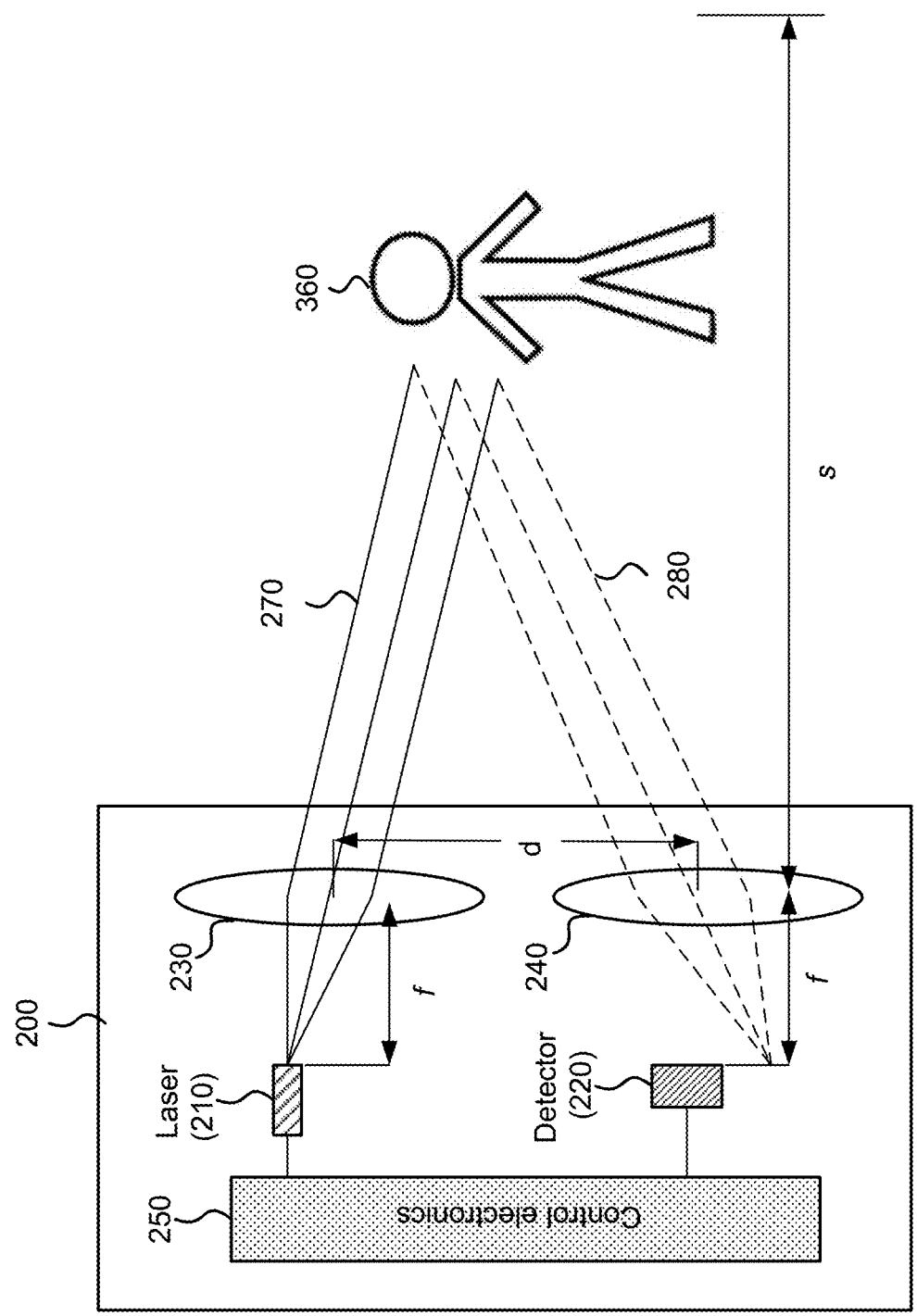
FIG. 3 illustrates an example of near-field detection for a LiDAR sensor.

For nearby objects (e.g., s~d), however, the parallax error can be significant. FIG. 3 illustrates an example of near-field detection for a LiDAR sensor. Referring to FIG. FIG. 3, assume that an object 360 (e.g., a person) is only 2500 mm (2.5 m) away from the LiDAR sensor 200 (the drawing in FIG. 3 is not to scale). Assume also that the focal length f of both the emission lens 230 and the receiving lens 240 is 50 mm, and the separation distance d between the emission lens 230 and the receiving lens 240 is 50 mm. The parallax error can be approximately (50×50)/2500=1 mm. Thus, if the size of the detector 220 is 0.5 mm in diameter, the return light rays 280 may miss the detector 220, as illustrated in FIG. 3. Thus, the object 360 may not be detected by the LiDAR sensor 200.

For the reasons discussed above, some LiDAR sensors may not be able to accurately detect nearby objects (e.g., within about 10 m from the LiDAR sensor). The exact lower limit of the detection range can depend on the focal length of the two lenses, and the separation distance between the two lenses. The ability to accurately detect nearby objects can be important for some applications of LiDAR sensors, such as for obstacle detection in an autonomous or semi-autonomous vehicle. If a LiDAR sensor is unable to detect a toddler standing near the vehicle (e.g., behind the vehicle when the vehicle is parked in a driveway), it can result in serious accidents.

Figure 4:
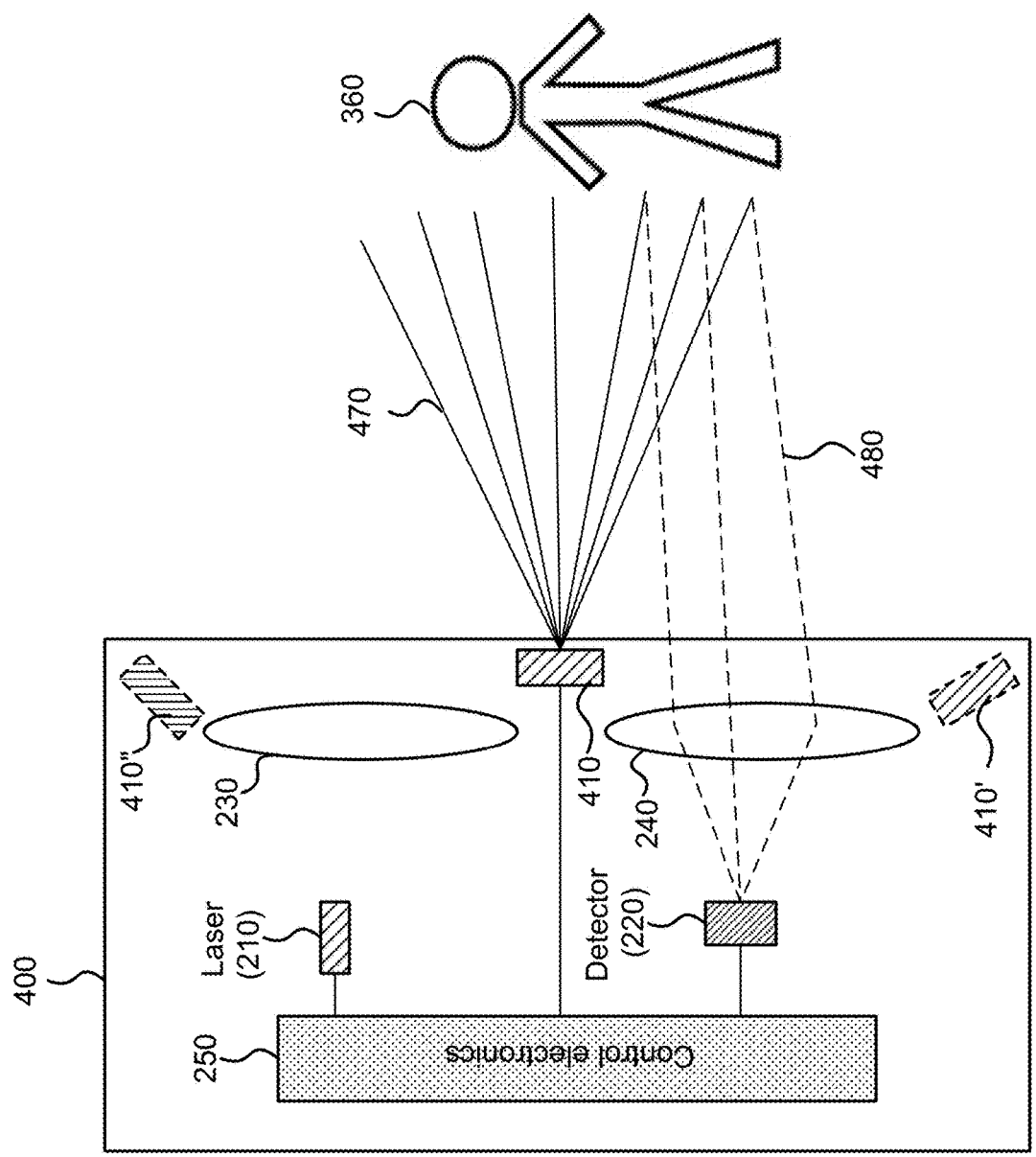
FIG. 4 shows a simplified block diagram of a LiDAR sensor that includes a flood illumination source according to some embodiments.

According to some embodiments, a flood illumination source is added to a LiDAR sensor to aid near-field detection. FIG. 4 shows a simplified block diagram of a LiDAR sensor 400 that includes a flood illumination source according to some embodiments. The LiDAR sensor 400 is similar to the LiDAR sensor 200 illustrated in FIGS. 2 and 3. But in addition to the regular laser source 210, the LiDAR sensor 400 also includes a flood illumination source 410, which can be communicatively coupled to the control electronics 250.

The flood illumination source 410 can be configured to emit light pulses that are not collimated. As illustrated in FIG. 4, light rays 470 of a light pulse can diverge and illuminate a large area in front of the LiDAR sensor 400. When the divergent light rays 470 hit an object (e.g., the person 360) in their path, some portion of the return light rays 480 can be focused by the receiving lens 240 onto the detector 220, as illustrated in FIG. 4. Thus, although a return laser pulse resulted from the regular laser source 210 (not shown in FIG. 4) may miss the detector 220 due to parallax (e.g., as illustrated in FIG. 3), the LiDAR sensor 400 may still be able to detect the nearby object 360 from the light pulses emitted by the flood illumination source 410. Therefore, the LiDAR sensor 400 can advantageously have an extended detection range in the near-field (e.g., from about 0.1 meters to about 10 meters from the LiDAR sensor 400).

According to some embodiments, the flood illumination source 410 can be placed in front of and laterally in the space between the emission lens 230 and the receiving lens 240. In this way, the optical paths of the light pulses emitted by the flood illumination source 410 may bypass the first lens or the second lens, so that the diverging light rays 470 of the light pulses are not collimated. The flood illumination source 410 can also be placed in other places in the LiDAR sensor 400. For example, the illumination light source 410' or 410" can be positioned next to the receiving lens 240 or next to the emission lens 230, as illustrated in FIG. 4 (the illumination light source 410' or 410" can be tilted as shown in FIG. 4).

According to various embodiments, the flood illumination source 410 can be a laser, a high power light-emitting diode (LED), or the like. The flood illumination source 410 may or may not include some optics (e.g., a built-in lens) to control its field of illumination. Because the light rays 470 of light pulses emitted by the flood illumination source 410 diverge, its luminance (intensity) may decrease with increasing distance approximately as an inverse quadratic function. Thus, the return light pulses may not have excessive powers that can cause inaccurate determination of distance and reflectance, as discussed above. In addition, since the flood illumination source 410 is mainly for detection of near-field objects, the flood illumination source 410 can be configured to be fired at lower powers. Thus, "blinding" of the detector 220 due to electromagnetic interference (EMI) can possibly be prevented.

The angular resolution of the LiDAR sensor 400 for near-field detection based on light pulses from the flood illumination source 410 may be determined by the size of the detector 220. For example, if the detector 220 has a diameter of 0.5 mm, the angular resolution can be about one degree. In comparison, the angular resolution of the LiDAR sensor 400 for far-field detection based on light pulses from the regular laser source 210 may be determined by the size of the laser source 210 and the quality of the collimation (which may depend on, e.g., the optical aberration of the emission lens 230). For example, if the laser source 210 has a diameter of 0.1 mm, the angular resolution of the LiDAR sensor 400 can be about 0.2 degrees. The relatively poor angular resolution for near-field detection may not be a significant disadvantage, as the linear spatial resolution for closer objects can be comparable to that for far away objects with higher angular resolution (e.g., since light rays diverge over a shorter distance). Also, the purpose of near-field detection may be just to determine the presence or the absence of any object nearby.

In some embodiments, to cover a certain field of view, the LiDAR sensor 400 can be scanned by scanning the laser source 210 and the detector 220 relative to the emission lens 230 and the receiving lens 240, respectively (e.g., as described above with reference to FIG. 1). For example, the laser source 210 and the detector 220 can be mounted on an optoelectronic board, which can be translated in a plane perpendicular to the optical axis of the LiDAR sensor 400. In some embodiments, the LiDAR sensor 400 can include an array of laser sources 210 and an array of detectors 220. In some embodiments, the flood illumination source 410 can be fixed, as it can illuminate a relatively large field of view simultaneously.

Figure 5:
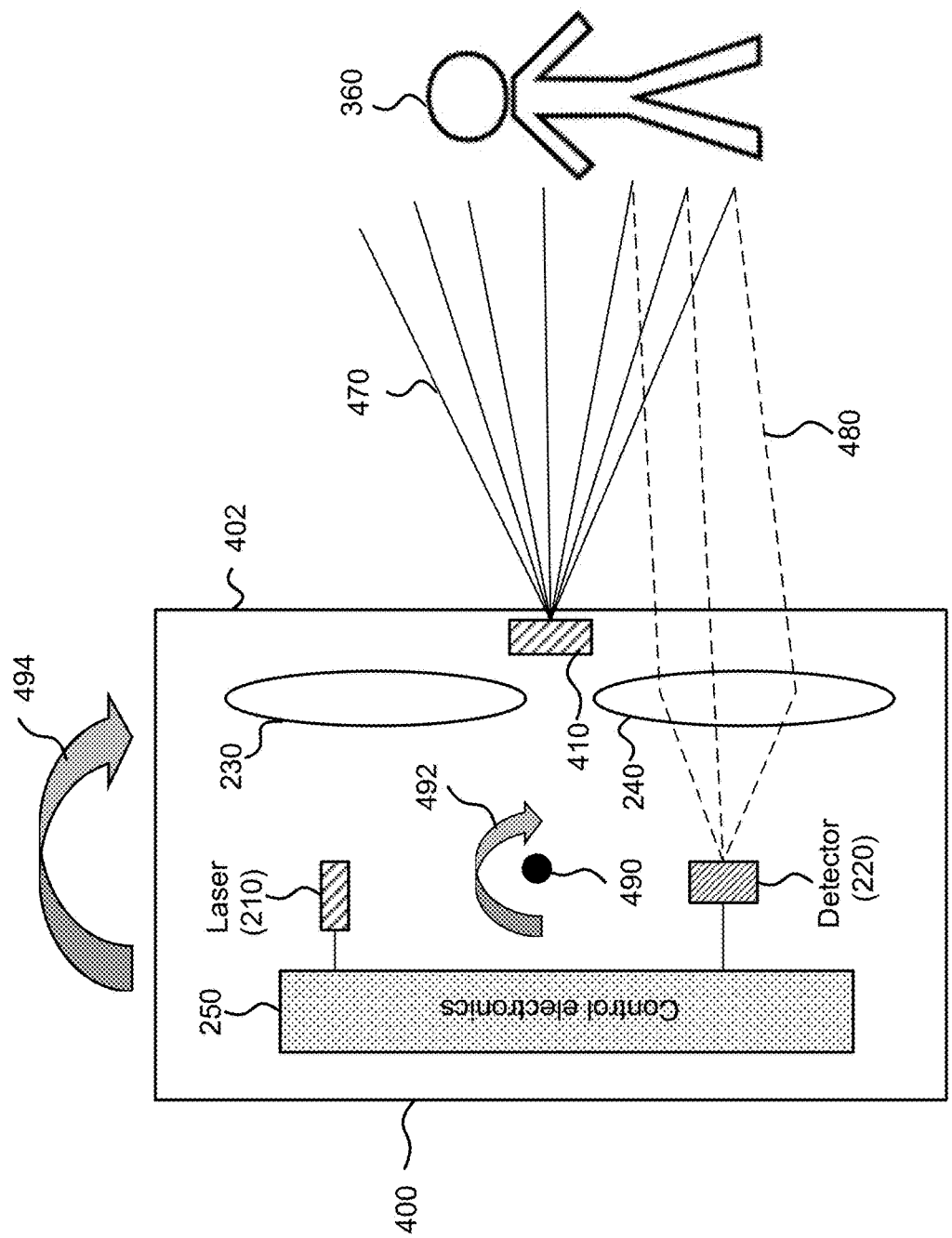
FIG. 5 shows a scanning LiDAR sensor including a flood illumination source according to some embodiments.

In some embodiments, the LiDAR sensor 400 can be scanned by rotating around an axis. FIG. 5 shows an example. The components of the LiDAR sensor 400 (e.g., the regular laser source 210, the flood illumination source 410, the detector 220, the emission lens 230, and the receiving lens 240) can be attached to a housing 402. As indicated by the arrows 492 and 494, the housing 402 can be rotated about the axis 490 (perpendicular to the page). The range of rotation can be, for example, from a few tens of degrees up to 360 degrees. In some embodiments, the housing 402 can also be tilted around an axis orthogonal to the axis 490. In some embodiments, the field of view in the orthogonal direction (e.g., the direction perpendicular to the page) can be expanded by having a plurality of lasers 210 and a plurality of detectors 220 disposed as arrays in the orthogonal direction.

Figure 6:
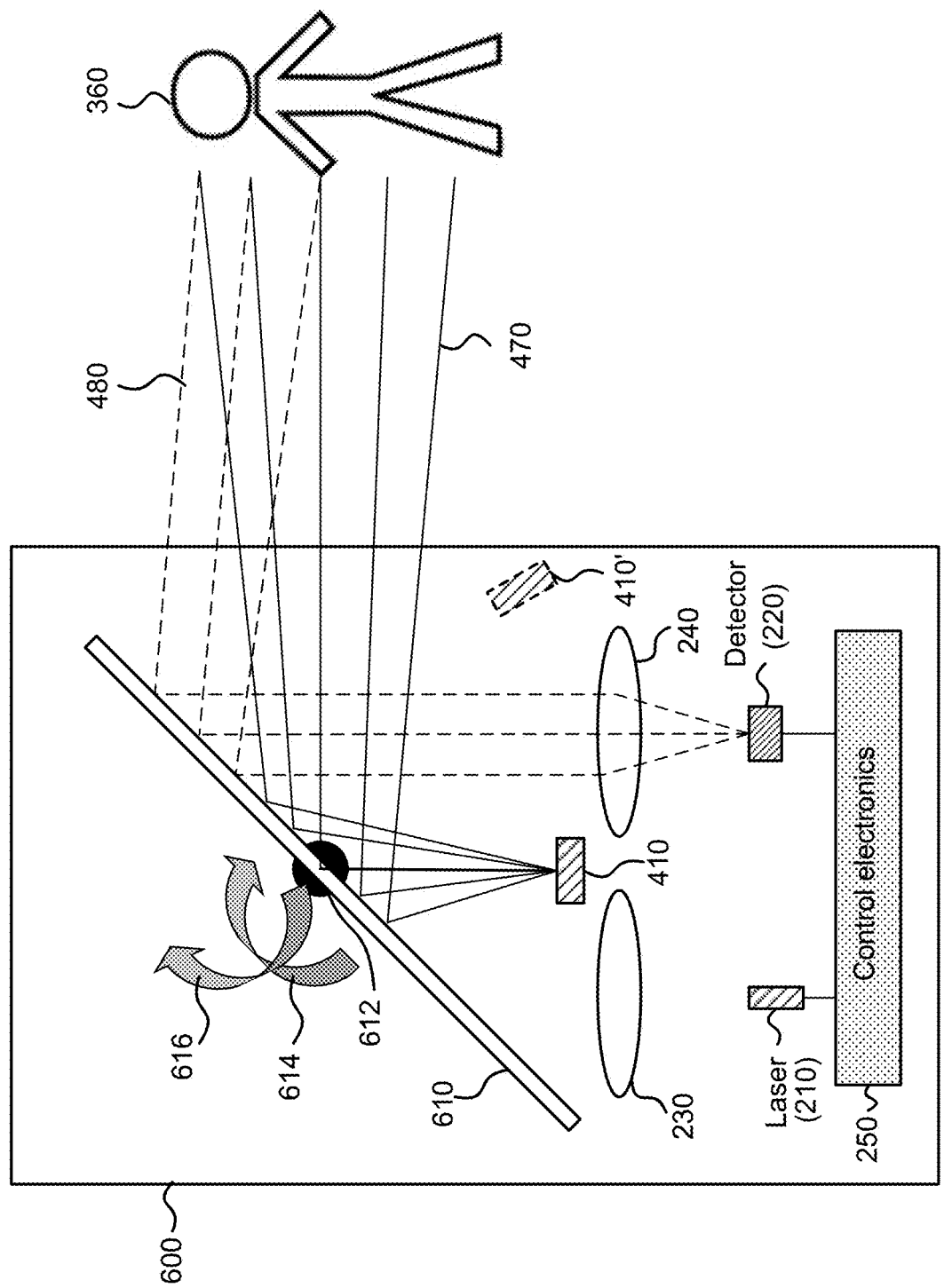
FIG. 6 illustrates a LiDAR sensor including a flood illumination source and a scanning mirror according to some embodiments.

In some embodiments, a LiDAR sensor can be scanned using a rotating or oscillating mirror. FIG. 6 illustrates a LiDAR sensor 600 that uses a scanning mirror according to some embodiments. The LiDAR sensor 600 is similar to the LiDAR sensor 400 illustrated in FIG. 4, and includes similar components. In addition to the laser source 210, the flood illumination source 410, the detector 220, the emission lens 230, and the receiving lens 220, the LiDAR sensor 600 also includes a mirror 610. The mirror 610 can be configured to rotate or oscillate about two axes around a point 612, as indicated by the arrows 614 and 616. By scanning the mirror 610 around the two axes, light pulses emitted by the laser source 210 can cover a certain field of view (light rays from the laser source 210 are not shown in FIG. 6). In some embodiments, two mirrors can be used for scanning the LiDAR sensor in two orthogonal directions. For example, the two mirrors can be arranged sequentially along an optical path, each mirror configured to be scanned around a respective axis.

In some embodiments, light pulses emitted by the flood illumination source 410 are also scanned by the mirror 610, as illustrated in FIG. 6. In some other embodiments, the flood illumination source 410' can be disposed after the mirror 610 along the optical path, as illustrated in FIG. 6. In such cases, the light pulses emitted by the flood illumination source 410' bypass the mirror 610 (light rays from the flood illumination source 410' are not shown in FIG. 6).

According to some embodiments, the flood illumination source 410 can be fired every time the regular laser source 210 is fired. FIGS. 7A-7C show some exemplary timing diagrams according to various embodiments. FIG. 7A shows a timing diagram in which the flood illumination source and the regular laser source are fired simultaneously. In this timing configuration, the detected signals 710 resulted from a light pulse emitted by the regular laser source and from a light pulse emitted by the flood illumination source can overlap.

FIG. 7B shows a timing diagram in which the regular laser source is fired first, followed by the firing of the flood illumination source after a certain time delay. In this timing configuration, the detector may detect a first signal 724 from a nearby object resulted from the light pulse 720 emitted by the regular laser source, and a second signal 726 from the same nearby object resulted from the light pulse 722 emitted by the flood illumination source. The first signal 724 can be relatively weak due to possible parallax problems (as discussed above), if it can be detected at all. In this timing configuration, there might be an ambiguity as to whether the second signal 726 is from a farther away object that resulted from the light pulse 720 emitted by the regular laser source or from a nearby object that resulted from the light pulse 722 emitted by the flood illumination source.

FIG. 7C shows a timing diagram in which the flood illumination source is fired first, followed by the firing of the regular laser source after a certain time delay. In this timing configuration, the detector may detect a first signal 734 from a nearby object resulted from the light pulse 732 emitted by the flood illumination source, and a second signal 736 from the same nearby object resulted from the light pulse 730 emitted by the regular laser source. If the time delay between the firing of flood illumination source and the firing of the regular laser source is large enough so that the first signal 734 is detected before the light pulse 730 is fired by the regular laser source, ambiguity about the source of the detected signal can be prevented.

In cases in which the flood illumination source is fired every time the regular laser source is fired, the light pulses emitted by the flood illumination can have lower powers than that of the light pulses emitted by the regular laser source, since the flood illumination source is mainly used to detect nearby objects. Also, the flood illumination source can be located at some distance from the detector. Thus, EMI issues can be minimized. In addition, the relatively low powers of the light pulses emitted by the flood illumination source can also prevent overloading the detector.

According to some embodiments, instead of firing both the regular laser source and the flood illumination for every detection time interval, the regular laser source and the flood illumination source may be fired in alternate detection time intervals. Alternatively, the flood illumination source may be fired once every few detection time intervals. FIG. 7D shows an exemplary timing diagram. In this timing configuration, only one light source—the regular laser source or the flood illumination source is fired in any given detection time interval. In the example shown in FIG. 7D, the regular laser source is fired for three consecutive detection time intervals, and the flood illumination source is fired in the fourth detection time interval. This timing pattern may then be repeated. Because only one light source is fired in any given detection time interval, ambiguity about the source of the detected signal can be avoided. In such embodiments, the flood illumination source may be fired only occasionally as a check for whether any object has moved into the near-field of the LiDAR sensor. In some embodiments, the timing pattern shown in FIG. 7D may be applied on a frame basis. For example, the regular laser source may be used for three consecutive frames, and the flood illumination source may be used for the fourth frame.

Figure 8:
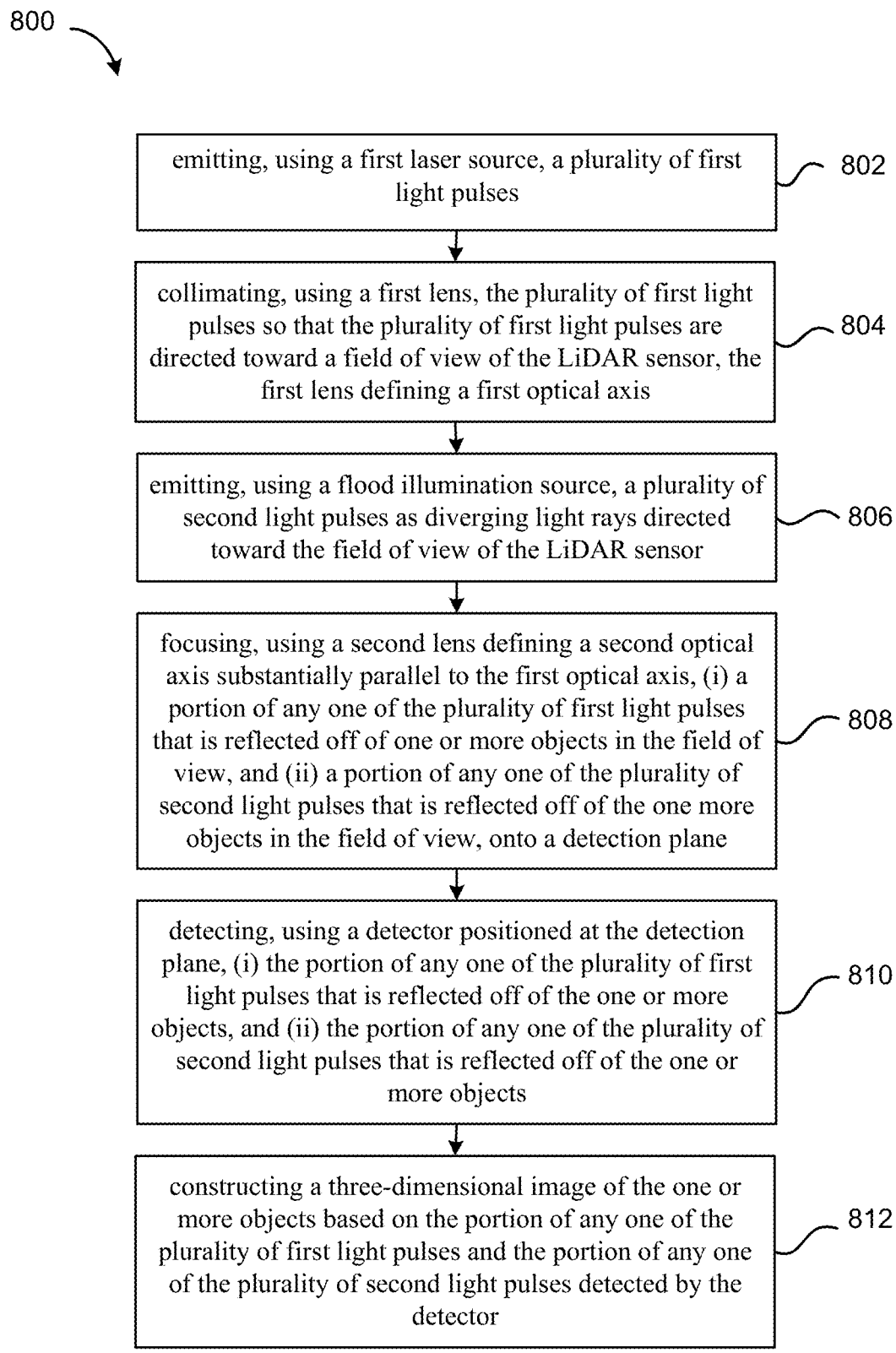
FIG. 8 shows a simplified flowchart illustrating a method of operating a LiDAR sensor according to some embodiments.

FIG. 8 shows a simplified flowchart illustrating a method 800 of operating a LiDAR sensor according to some embodiments.

The method 800 includes, at 802, emitting, using a first laser source, a plurality of first light pulses; and at 804, collimating, using a first lens, the plurality of first light pulses so that the plurality of first light pulses are directed toward a field of view of the LiDAR sensor. The first lens defines a first optical axis. The method 800 further includes, at 806, emitting, using a flood illumination source, a plurality of second light pulses as diverging light rays directed toward the field of view of the LiDAR sensor.

The method 800 further includes, at 808, focusing, using a second lens defining a second optical axis substantially parallel to the first optical axis, (i) a portion of any one of the plurality of first light pulses that is reflected off of one or more objects in the field of view, and (ii) a portion of any one of the plurality of second light pulses that is reflected off of the one more objects in the field of view, onto a detection plane.

The method 800 further includes, at 810, detecting, using a detector positioned at the detection plane, (i) the portion of any one of the plurality of first light pulses that is reflected off of the one or more objects, and (ii) the portion of any one of the plurality of second light pulses that is reflected off of the one or more objects. The method 800 further includes, at 812, constructing a three-dimensional image of the one or more objects based on the portion of any one of the plurality of first light pulses and the portion of any one of the plurality of second light pulses detected by the detector.

It should be appreciated that the specific steps illustrated in FIG. 8 provide a particular method of operating a LiDAR sensor according to some embodiments. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A LiDAR sensor comprising:
a first lens defining a first optical axis;
a first laser source disposed substantially at a focal plane of the first lens, and configured to emit a plurality of first light pulses to be collimated by the first lens and directed toward a field of view of the LiDAR sensor;
a flood illumination source configured to emit a plurality of second light pulses as diverging light rays directed toward the field of view of the LiDAR sensor;
a second lens defining a second optical axis substantially parallel to the first optical axis, the second lens configured to:
receive and focus a portion of any one of the plurality of first light pulses that is reflected off of one or more objects in the field of view onto a focal plane of the second lens; and
receive and focus a portion of any one of the plurality of second light pulses that is reflected off of the one or more objects in the field of view onto the focal plane of the second lens;
a detector disposed substantially at the focal plane of the second lens, the detector configured to detect (i) the portion of any one of the plurality of first light pulses that is reflected off of the one or more objects, and (ii) the portion of any one of the plurality of second light pulses that is reflected off of the one or more objects; and
a processor communicatively coupled to the first laser source, the flood illumination source, and the detector, the processor configured to construct a three-dimensional image of the one or more objects based on the portion of any one of the plurality of first light pulses, emitted by the first laser source and reflected off the one or more objects in the field of view, and the portion of any one of the plurality of second light pulses, emitted by the flood illumination source and reflected off the one or more objects in the field of view, detected by the detector.

2. The LiDAR sensor of claim 1 wherein optical paths of the plurality of second light pulses emitted by the flood illumination source do not intercept the first lens or the second lens before being reflected off of the one or more objects.

3. The LiDAR sensor of claim 1 wherein the flood illumination source is disposed between the first lens and the second lens in a lateral direction perpendicular to the first optical axis.

4. The LiDAR sensor of claim 1 wherein the flood illumination source comprises a laser or a light-emitting diode (LED).

5. The LiDAR sensor of claim 1 wherein the portion of any one of the plurality of second light pulses includes a portion of at least one of the plurality of second light pulses that is reflected off of a first object among the one or more objects, and the first object is within about 10 meters from the LiDAR sensor.

6. The LiDAR sensor of claim 1 wherein the first laser source is configured to be translated in the focal plane of the first lens, and the detector is configured to be translated in the focal plane of the second lens synchronously with the translation of the first laser source, so as to scan the plurality of first light pulses across the field of view.

7. The LiDAR sensor of claim 1 further comprising:
a housing, wherein the first lens, the second lens, the first laser source, the flood illumination source, and the detector are attached to the housing; and
a drive mechanism configured to rotate the housing about one or two axes, so as to scan the LiDAR sensor across the field of view.

8. The LiDAR sensor of claim 1 further comprising:
a mirror configured to reflect the plurality of first light pulses emitted by the first laser source toward the field of view; and
a drive mechanism configured to rotate the mirror about one or two axes, so as to scan the LiDAR sensor across the field of view.

9. The LiDAR sensor of claim 8 wherein the mirror is further configured to reflect the plurality of second light pulses emitted by the flood illumination source toward the field of view.

10. The LiDAR sensor of claim 8 wherein the flood illumination source is disposed in a position so that the plurality of second light pulses emitted by the flood illumination source is directed toward the field of view without being reflected by the mirror.

11. A method of operating a LiDAR sensor, the method comprising:
emitting, using a first laser source, a plurality of first light pulses;
collimating, using a first lens, the plurality of first light pulses so that the plurality of first light pulses are directed toward a field of view of the LiDAR sensor, the first lens defining a first optical axis;
emitting, using a flood illumination source, a plurality of second light pulses as diverging light rays directed toward the field of view of the LiDAR sensor;
focusing, using a second lens defining a second optical axis substantially parallel to the first optical axis, (i) a portion of any one of the plurality of first light pulses that is reflected off of one or more objects in the field of view, and (ii) a portion of any one of the plurality of second light pulses that is reflected off of the one or more objects in the field of view, onto a detection plane;
detecting, using a detector positioned at the detection plane, (i) the portion of any one of the plurality of first light pulses emitted by the first laser source that is reflected off of the one or more objects, and (ii) the portion of any one of the plurality of second light pulses emitted by the flood illumination source that is reflected off of the one or more objects; and
constructing a three-dimensional image of the one or more objects based on the portion of any one of the plurality of first light pulses and the portion of any one of the plurality of second light pulses detected by the detector.

12. The method of claim 11 wherein optical paths of the plurality of second light pulses emitted by the flood illumination source do not intercept the first lens or the second lens before being reflected off of the one or more objects.

13. The method of claim 11 wherein the portion of any one of the plurality of second light pulses includes a portion of at least one of the plurality of second light pulses that is reflected off of a first object among the one or more objects, and the first object is within about 10 meters from the LiDAR sensor.

14. The method of claim 11 wherein the plurality of first light pulses and the plurality of second light pulses are emitted synchronously, so that each respective first light pulse and each corresponding second light pulse are emitted simultaneously.

15. The method of claim 11 wherein the plurality of first light pulses and the plurality of second light pulses are emitted synchronously, so that each respective second light pulse is emitted after each corresponding first light pulse is emitted with a time delay that is less than a detection time interval.

16. The method of claim 11 wherein the plurality of first light pulses and the plurality of second light pulses are emitted synchronously, so that each respective first light pulse is emitted after each corresponding second light pulse is emitted with a time delay that is less than a detection time interval.

17. The method of claim 11 wherein the plurality of first light pulses and the plurality of second light pulses are emitted in a timing pattern so that, in each detection time interval, only one of the plurality of first light pulses or one of the plurality of second light pulses is emitted.

18. The method of claim 11 further comprising:
translating the first laser source in an emission plane so as to scan the plurality of first light pulses across the field of view; and
translating the detector in the detection plane synchronously with the translation of the first laser source.

19. The method of claim 11 wherein the first lens, the second lens, the first laser source, the flood illumination source, and the detector are attached to a housing, and the method further comprising:
rotating the housing about one or two axes, so as to scan the LiDAR sensor across the field of view.

20. The method of claim 11 wherein the LiDAR sensor comprises a mirror configured to reflect the plurality of first light pulses toward the field of view, and the method further comprising:
scanning the mirror about one or two axes, so as to scan the LiDAR sensor across the field of view.

* * * * *